June 27, 1961

S. S. ZIMMERMAN 2,989,780

METHOD AND APPARATUS FOR FORMING
THERMOPLASTIC SHEETS

Filed July 2, 1953

INVENTOR.
SANFORD S. ZIMMERMAN
BY
*Albert M. Parker*
ATTORNEY.

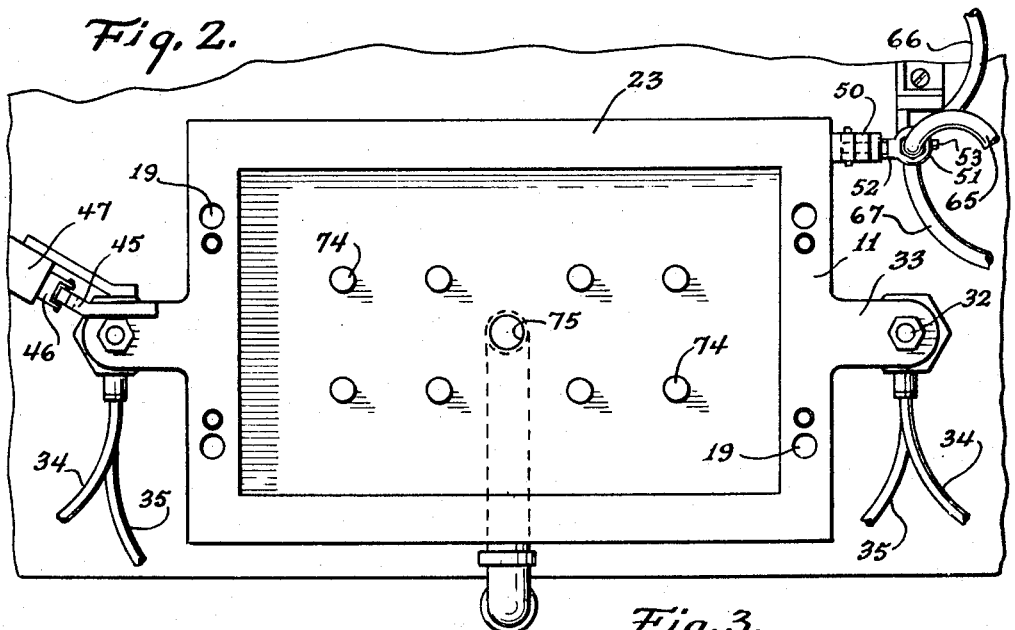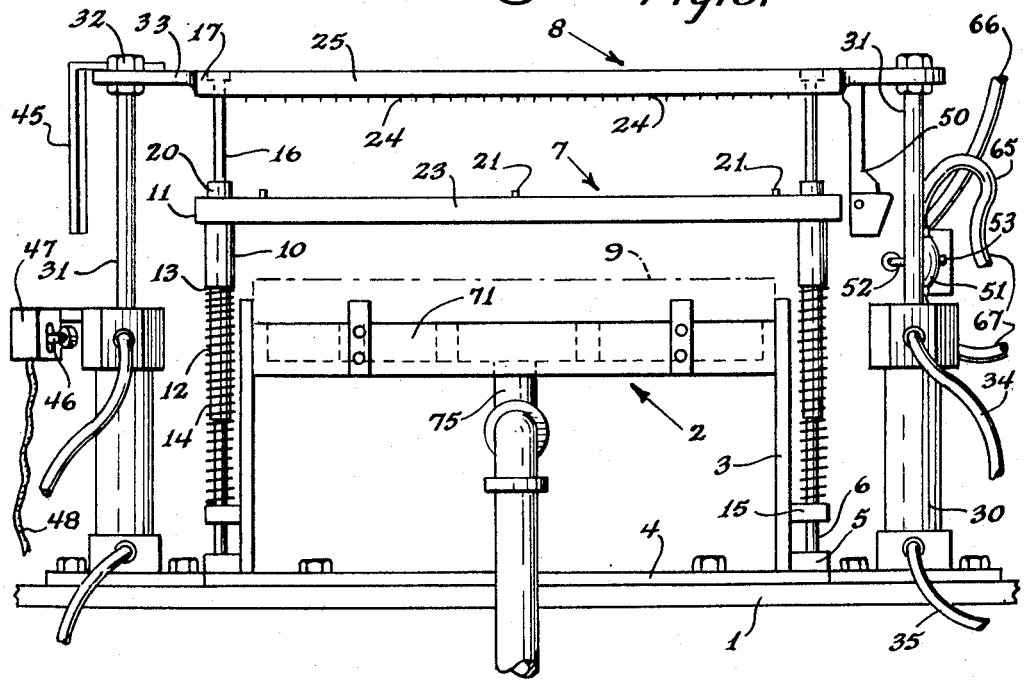

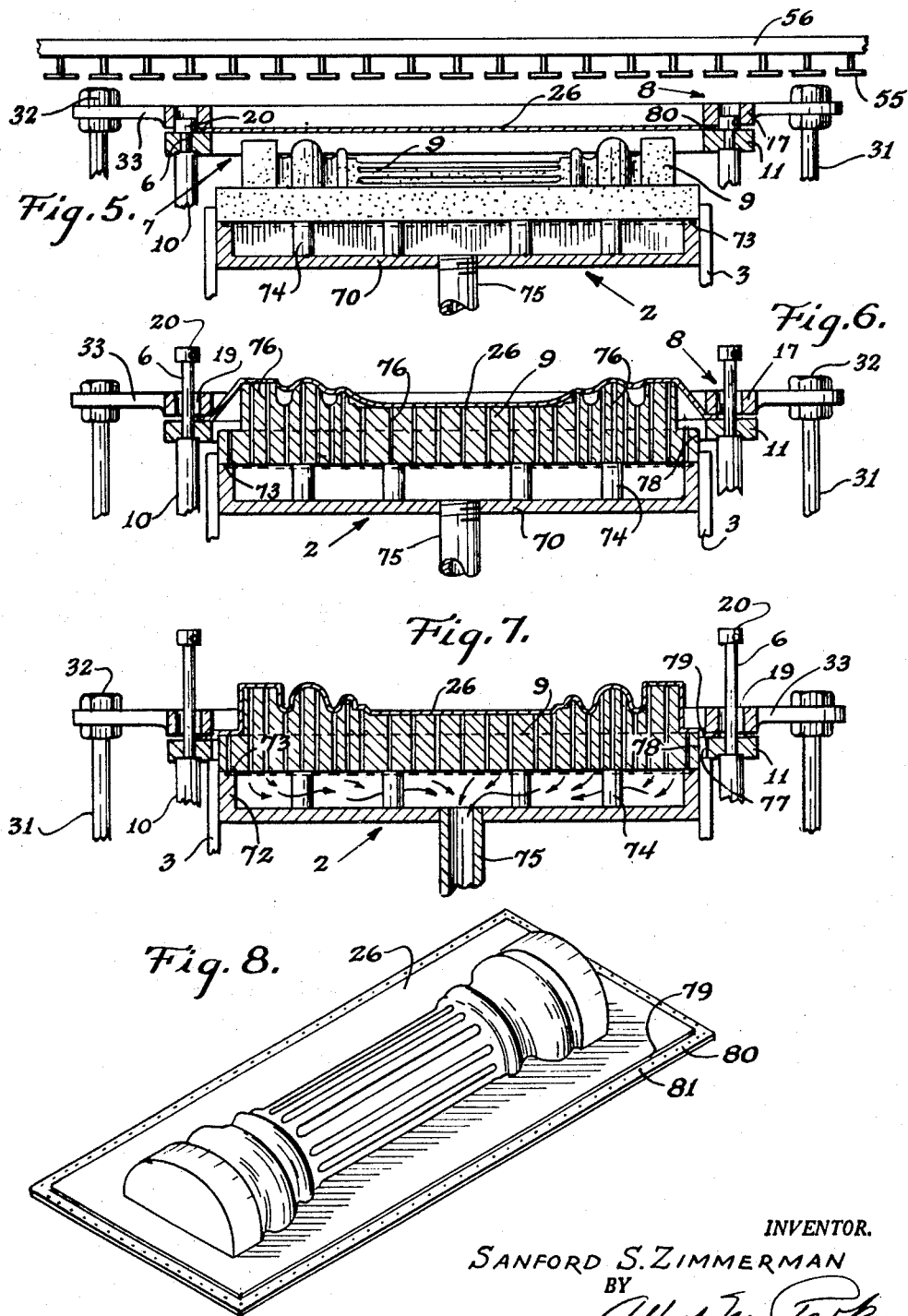

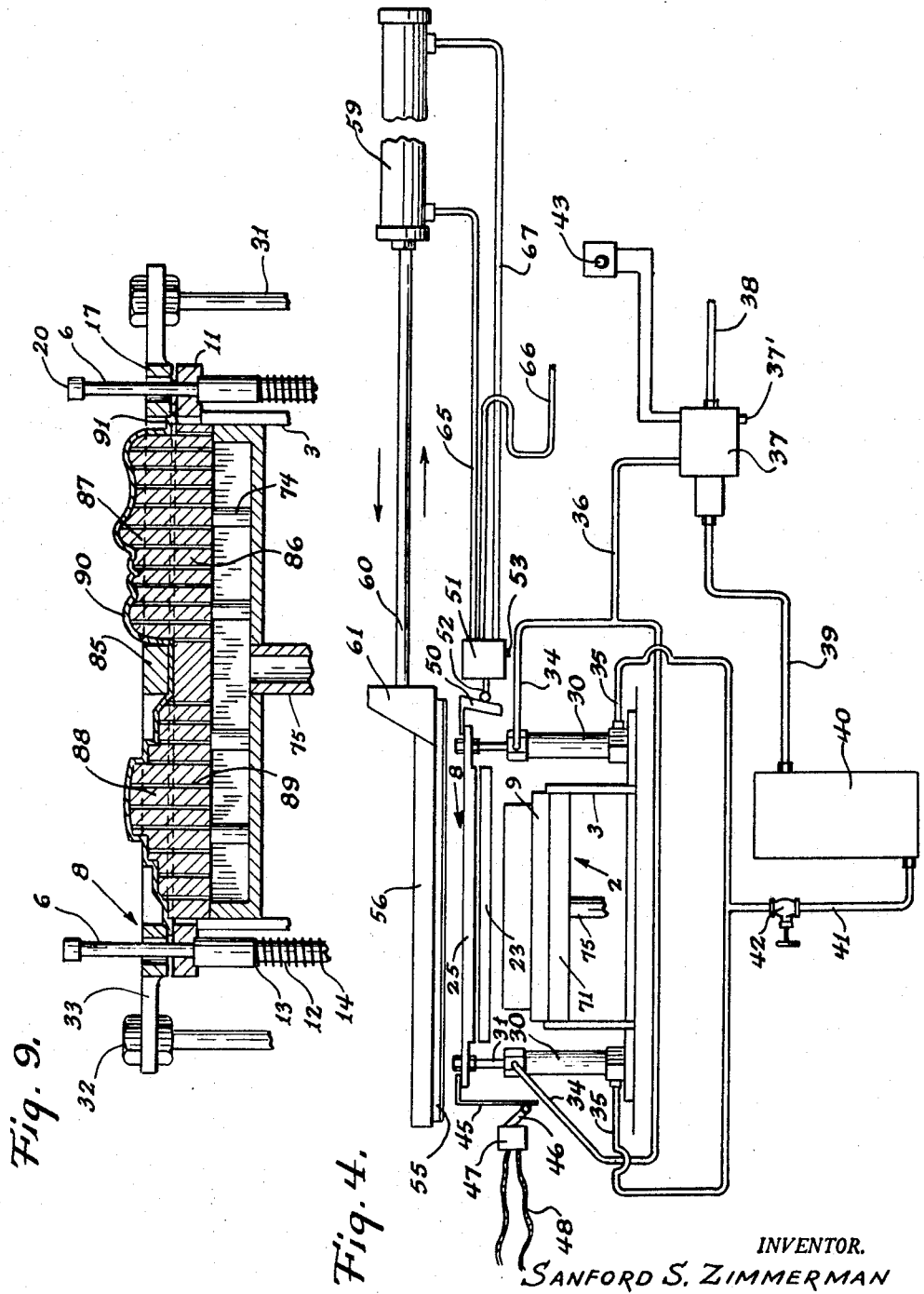

United States Patent Office 2,989,780
Patented June 27, 1961

2,989,780
METHOD AND APPARATUS FOR FORMING THERMOPLASTIC SHEETS
Sanford S. Zimmerman, Valley Stream, N.Y., assignor, by mesne assignments, to Emhart Manufacturing Company, Hartford, Conn., a corporation of Delaware
Filed July 2, 1953, Ser. No. 365,663
3 Claims. (Cl. 18—19)

This invention relates to a method and apparatus for forming thermoplastic sheets and is particularly concerned with effecting such forming by the action of vacuum, and by vacuum action in conjunction with mechanical moulding.

The principal objects of the invention are to simplify and expedite the forming of thermoplastic sheets into desired conformations.

Another object is to provide for such forming in a substantially automatic manner.

Still another object is to provide for such forming in a fast and accurate manner, producing a product which is superior to those previously made.

A further object is to provide for the rapid forming of thermoplastic sheets into desired contour by a combination of mechanical and vacuum action.

A further object is to provide for the forming of thermoplastic sheets into formations having lateral reentrant portions.

A still further object is to provide for such forming which retains strength in the formed sheet where it is most needed.

A more detailed object is to provide for such forming which may be carried out in a fool-proof manner by relatively unskilled labor.

Further and more detailed objects of the invention will in part be obvious and in part be pointed out as the description of the invention, taken in conjunction with the accompanying drawing, proceeds.

In that drawing:

FIGURE 2 is a top plan view of the clamping and forming features of the apparatus as viewed by looking down from the top at the left hand portion of the apparatus shown in FIGURE 1.

FIGURE 3 is a front elevation of the apparatus as shown in FIGURE 2, showing the elements thereof in open position.

Figure 1:
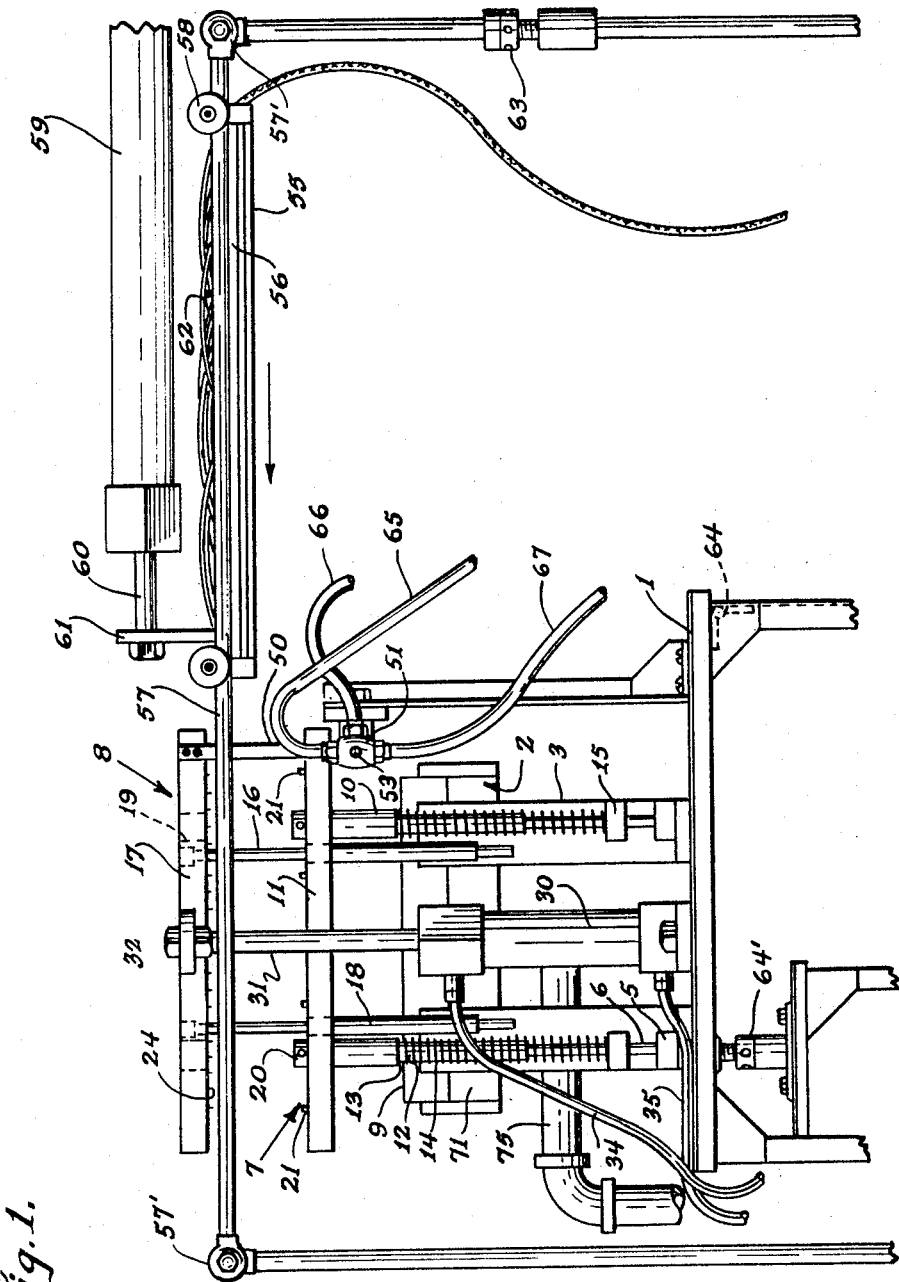
FIGURE 1 is a side elevational view of apparatus in accordance with the invention and for performing the method thereof, certain non-essential elements having been omitted from this showing for clarity of illustration.

FIGURE 4 is a schematic showing of portions of the apparatus illustrating parts of the control features thereof and with the sheet clamping and forming features of the apparatus shown in front elevation, but with the heater and heater feeding mechanism shown at right angles to the position it properly occupies, as seen in FIGURE 1, this part of the showing being displaced at such angle for illustrative purposes.

FIGURE 5 is a fragmentary front elevation, partly in section, showing a sheet clamped and positioned for forming in accordance with the invention with the heating elements in place for such forming.

FIGURE 6 is a similar view showing the next step in the operation.

FIGURE 7 is a similar view, showing the subsequent and final step with the vacuum applied.

FIGURE 8 is a perspective view of the final product, and

FIGURE 9 is a view similar to FIGURE 7 illustrating a slightly modified arrangement.

In the embodiment of apparatus in accordance with the invention as here illustrated, the table, or other suitable support 1, is employed for the supporting of the positioning and forming portions of the apparatus. A suction box 2 is mounted on this table by suitable means, here shown as upright legs 3, four of which are here employed, two at each end of the suction box. These legs are mounted on straps 4, secured to the table 1. These straps extend outwardly beyond the legs 3 sufficiently to carry mounting blocks 5 which serve to rigidify the securing of the legs 3 to the straps 4 and also serve as end mountings for guide rods 6, one of which extends up along the outer side of each of the legs 3. The guide rods 6 serve as the guiding and mounting means for the lower frame member 7 on which the thermoplastic sheet is seated for forming. The lower frame member 7 cooperates with the upper frame member 8 to retain and clamp the edges of the sheet, while the same is being heated and formed, as will appear in detail hereinafter. At this point it is sufficient to appreciate, as seen in FIGURES 4–7, that the upper and lower frame members come together to clamp the sheet and from that point on act as a single frame and when so positioned will jointly be referred to as a frame.

The lower frame member 7 is mounted for accurate movement upward and downward with respect to the suction box 2 and, of course, with respect to the mould 9 mounted thereon. This is achieved by a plurality of sleeves 10, two on each end 11 of the lower frame member 7, receiving the guide rods 6 in sliding relationship. The sleeves 10 are reduced in diameter at 12 providing a shoulder 13 to retain one end of the spring 14. The other end of the spring seats against a projection 15 extending outwardly from the leg 3 for this purpose, which projection is bored to receive the guide rods 6 therethrough. The springs 13 serve to retract the frame members upward after the forming operation has been completed. Thus, they are shown in expanded position in FIGURE 3. It is understood, however, that when the frame is down in operating position with respect to the mould, these springs will be compressed, ready to react and raise the frame when the moulding action is completed.

The upper frame member 8 is located and guided by a plurality of guide pins 16 suitably secured, two in each end 17 of the upper frame member 8. These pass down through the ends 11 of the lower frame member 7 and ride in guide sleeves 18 secured to the ends 11. At this point it is also to be noted that the ends 17 of the upper frame member are bored at 19 (FIGURE 2) in alignment with the heads 20 of the rods 6, so that those heads can project up through the upper frame member 8, as the frame reaches its full downward position.

The forming of the sheets and clamping of the same around their margins is effected by bringing the upper and lower frame members together. Preferably, the lower frame member has suitable locating pins 21, or other locating devices, for enabling the operator to seat the desired size of sheet thereon, with part of the frame 7 bordering it all around. The locating pins 20 seat in mating recesses in the upper frame member 8. Once a sheet is seated and located on the frame member 7, it is secured in place there for heating and forming by bringing the upper frame member 8 down into engagement with it. In addition, the upper frame 8 is provided with a large number of holding pins 24 on both its longitudinal members 25 and its ends 17. These are sharp pins which readily pass through the plastic sheet and seat in mated recesses provided therefor in the longitudinal and transverse members 23 and 11 of the frame 7. Referring to FIGURE 5, it can be seen how a thermoplastic sheet 26 is effectively clamped by the upper and lower frame members coming together against the surfaces of it, as well as being held by the pins 24.

A pair of cylinders, here shown as operating on a combination of pneumatic and hydraulic action, but which, if desired, may be merely hydraulic, are employed for both the clamping of the sheet and the moving of it into desired position with respect to the mould. These cylinders, indicated at 30, are located and secured on the base 1 outwardly of the ends of the frame members 7 and 8. These cylinders have actuating pistons therein on the lower end of piston rods 31, whose upper ends 32 are fixedly secured to outwardly extending arms 33 located at the mid-position of the ends 17 of the frame 8. Air inlets 34 are provided for introducing air into the cylinders 30 above their pistons, while oil lines 35 are connected to the bottoms of the cylinders 30 in order to establish and maintain the desired oil level therein.

The air lines 34, as shown in FIGURE 4, extend into a common line 36 which comes from a solenoid operated spring return four-way air valve 37. The valve 37 has an exhaust to atmosphere at 37', an air inlet at 38 and another outlet 39. The latter serves to admit air into the upper end of an oil tank 40 from whose lower end oil is forced through the line 41 and through the inlets 35 into the bottom of the cylinders 30. This oil feeding system is merely used when it is desired to change the oil level in the cylinders 30. For normal operation of the apparatus, once the oil level is set to provide an accurate stop for the piston, no change is made, so the oil system is kept closed by means of the valve 42.

A manually operated starter button 43 is provided to actuate the solenoid control for the valve 37 and thus start air flowing in the pipe 36. Two other control elements are here shown as actuated by the upper frame member 8, it being of course understood that the types and locations of such members as here shown are for illustrative purposes only, while such changes as would occur to those skilled in the art are deemed to fall within the scope of the instant invention.

As best seen in FIGURE 4, the left hand end of the upper frame member 8 carries an actuating rod 45 extending outwardly and downwardly therefrom. This actuating rod is positioned so that in the downward movement of the frame 8 it will engage the pivoted arm 46 of the limit switch 47. This switch is connected through suitable leads 48 to the overall timing device (not shown), of conventional settable type, which times the various stages of the operation once that operation is started by means of the starter button 43. Timing of the various stages can be effected in a variety of manners employing equipment available for such purpose. The applicability of such equipment to the system shown would be recognized by those skilled in the art, so it is not believed necessary to encumber the present illustration with a showing of it.

The other end of the frame member 8 is provided with another actuating arm 50, which actuates an air valve 51. This is a four-way valve and, as here shown, operates by the variable positioning of the plunger 52. This valve has an exhaust to atmosphere at 53 and serves to control the movement of the bank of heaters 55 mounted on the carriage 56 into position over the sheet carried by the framing members 7 and 8. The carriage 56, as seen in FIGURE 1, is suitably mounted for transverse movement into position above the sheet, once the frame member 8 is drawn down against the frame member 7. Track members, such as 57, are provided at each side of the clamping frames, and the carriage 56 is provided with rollers 58 to ride thereon. Movement of the carriage from one extreme to the other is effected by means of an elongated air cylinder 59 whose piston rods 60 have their outer ends fixed to a plate 61 extending upwardly from the carriage 56.

Air under pressure may be admitted to either end of the cylinder 59, and is so admitted in proper timed relation to the other steps in the operation of the apparatus, so that the heating of the sheet in the frame members 7 and 8 will commence at the right time, will continue for the desired length of time and then the carriage carrying the heaters will be retracted after the proper heating has been effected and in order to enable upward movement and separation of the frame members. The heaters 55 are here shown as of the strip type (but may be of any other suitable type). They are separately connected through the leads, such as 62 (FIGURE 1), to an electrical control panel suitably instrumented to indicate the temperature of the heater strips and provided with controls for enabling that heat to be adjusted. Such equipment is readily obtainable in today's market and the applicability of it is well known to those skilled in the electrical arts, so it is not believed necessary to provide all the detail of it here.

Through the individual leads to the heater strips, the heat given off by them can be controlled as desired by cutting some of the heater strips in, or out, or even by varying the temperature of some with respect to others.

Mechanical means are provided to effect overall control of the heating in another manner. When the carriage moves over and back across the sheet in parallel relation with respect thereto, the portion of the sheet which is first overlaid by the heaters will tend to be heated to a greater extent than the remote portion which is reached last. To compensate for this effect when the type of sheet material being heated responds undesirably to it, provision is made for establishing an angular relation of relative movement somewhat off of the parallel. This is done by tilting the carriage track 57, or the table 1, or both.

Where the carriage track is to be tilted, the joints between the vertical supports and the track members 57 (FIGURE 1), are in the form of knuckle joints 57'. Then the right hand vertical supports for the track 57, as viewed in FIGURE 1, have jacks 63 incorporated therein to enable the right hand ends of the tracks to be raised. Thus the heaters will approach a position over the sheet at an incline and the further the carriage moves across the sheet the greater the distance will be between the portion of the sheet heated first and the heaters. Also, the heaters stay in position over the sheet for a preselected period of time. The heating across the sheet will be equalized thereby.

The same result can be achieved, or supplemented, by hinging the table 1 at 64 to its supporting frame, as shown in FIGURE 1. Then the left hand side of the table can be tilted upwardly by means of a jack or other suitable device 64'. In these ways the heating of the sheet all the way across it can be equalized.

Reverting for a moment to the valve 51, it will be noted that as the inclined actuating member 50 descends, it will move the plunger 52 to various positions. The first of these will permit a bleeding of the air from the left hand cylinder 59 through the conduit 65 out through part 53, followed by an admission of air from the lead 66 into the conduit 67, which enters the cylinder 59 at the right hand end thereof, as viewed in FIGURE 4. This air will act on the plunger within the cylinder and move the same forward to move the carriage 56 and the heaters 55 into extreme forward position over the sheet to be heated.

Once the sheet has been heated sufficiently as determined by elapsed time, the timing device will cause the frame to be lowered still further. Then, by continuing the inward movement of the plunger 52, the position of the valve 51 is changed resulting in exhausting the air from the right hand side of the cylinder and introducing air under pressure on the left hand side to move the piston backward and return the carriage with its heaters to the FIGURE 1 position.

Though this action has been here shown as taking place by means of the valve 51 and the cam-like actuator therefor, it is of course to be understood that this is merely for illustrative purposes and that other mechanism similarly cycled could be employed to do the job. One alternative already present in the existing system is to connect the air lines for the cylinder 59 to a suitable electrical control valve, the electrical control of which is effected by means of the overall timing device for the apparatus. Again, the applicability of these features in and of themselves is within the skill of those versed in the electrical mechanical arts and need not be gone into in detail here.

Coming now to the suction box 2 per se, it is to be noted that it has a bottom wall 70, and upstanding side and end walls 71 and 72, leaving an open top across it for the mounting of the mould member 9 thereon. This mould member over which the sheet is formed is preferably, though not necessarily, of the male type. Gasketing is provided at 73 where mould member 9 seats down on the end faces of the walls 71 and 72. Supporting members, such as posts or webs, 74, extend up from the base of the suction box to support the mould at desired positions about its bottom surface.

Suction within the chamber of the suction box enclosed by the mould is effected through a suction pipe 72 connected through suitable timed control mechanism with a vacuum tank, or other adequate source of reduced pressure. Here again the valve mechanism for applying the suction is time controlled by the master timer, so that the suction is applied at just the right time and shut off, with the possible replacement by air under atmospheric pressure at the completion of the forming. The amount and pressure of the air permitted to enter between the formed sheet and the mould can be controlled by suitable mechanism involving control of flow and timing. In this way, employing moulds with a substantial degree of undercut is made possible since the piece once formed and set has a certain degree of resiliency and ability to expand. It can thus be expanded by the air under it to remove it from the mould, after which it will return to desired form.

The mould 9, being provided with the desired formation to be imparted to the sheet being formed, here shown as a pilaster, is drilled through with a number of suitably placed drill holes 76, so that the suction effect produced in the suction box at the proper time can be made effective to draw the thermoplastic sheet down into the contours of the mould.

The dimensional relationship of the periphery of the mould element with respect to the internal periphery of the frame carrying the sheet is of importance here, as indicated in FIGURE 7, and as shown in the finished product illustrated in FIGURE 8. Referring to FIGURE 7, wherein the frame has reached its full downward position and the suction is acting upon the sheet, it will be noted that the inner periphery 77 of the frame is spaced a short distance away from the outer periphery 78 of the mould. This permits the edge 79 of the sheet 26, when in heated, plastic condition, to be drawn down around the upper edge of the surface 78. This condition exists all around the periphery of the mould and enables the forming of a suction tight joint therearound, between the sheet and the mould, obviating the necessity of employing any gasketing or packing, or the making of other special provision. A highly effective engagement is achieved when the sheet is in thermoplastic condition. It assures that the suction action will be concentrated where needed throughout the area of the sheet and will not be dissipated by leakage at the borders thereof.

Considering the method of the invention and the manner in which the same is carried out by the embodiment of the apparatus disclosed herein, reference is made to the showings in FIGURES 1 and 3 where the frame members 7 and 8 are in their uppermost position with the member 8 spaced well above the member 7. Also, the heater carriage 56 is in its fully retracted position.

The power is turned on to get the strip heaters 55 up to desired temperature, while the pressure in the vacuum tank is reduced to the desired degree of vacuum and the air pressure is built up for the operation of the pressure responsive devices. The operator then inserts a sheet of thermoplastic material of preselected proper size between the frame members 7 and 8, and seats the same down on the frame 7, locating it by means of the suitable locating pins 21. He then presses the starter button 43, introducing air into the cylinders 30 through the conduits 34. This draws the frame 8 down until the same clamps the edge 80 of the sheet 26 between the frame members, at the same time securing that edge by perforating it at 81 by means of the pins 24. The edge of the sheet is accordingly clamped and held tightly in position.

As the frame member 8 starts downward, the valve 51 is operated to introduce air into the remote end of the cylinder 59 and start the inward movement of the carriage 56 across the frame. As the heater carriage comes into full operative position, the frame members move down to a position closely overlying the mould 9, as best seen in FIGURE 5. This positioning is important, for it leaves little travel of the sheet to engage the mould, and, in fact, should the sheet sag sufficiently when rendered thermoplastic by the heat, portions of it may rest on and be supported by the mould.

Once the heating is conducted for the predetermined desired time, the timer causes a further lowering of the frame members 7 and 8 by the additional introduction of air into the cylinders 30 to create a mechanical draping of the thermoplastic sheet over and about the mould. This takes place before any suction is applied, and it is important from the standpoint of the characteristics imparted to the final product. To be specific, the rendering of the sheet thermoplastic closely adjacent the form and the mechanical draping of the sheet immediately thereafter, enables the sheet to fall into the contour of the form to a substantial extent with a uniform drawing of the sheet maintaining a constant thickness of it in the parts being formed. Thus, the full body and strength of the sheet is retained to a substantial degree in the areas where the greatest forming takes place, which, of course, are the areas where it is really needed. This is generally contrary to prior practices, particularly those employing female type moulds, since there the sheet is thinned out and drawn the most where it is formed the most.

Once the sheet is properly draped mechanically over the form, the frame members continue their downward movement until the edge of the sheet is secured and formed into the corners 79 around the periphery of the frame and the mould, as already pointed out. At this instant the timing device actuates the vacuum valve creating a suction through the pipe 75 and the chamber of the suction box. This suction acts through the holes 76 to draw the sheet down tightly against the form, resulting in very fine definition of the finished product, as illustrated in FIGURE 8, while, at the same time, retaining and distributing a substantial part, at least, of the strength of the original sheet throughout the new formation. When the sheet is set, which takes place very quickly, the suction is cut off, as is the air going into the cylinders 30 above their pistons, and the frames are retracted by the action of the springs 14. The pipe 75 may be open to atmosphere, if desired, to assist in freeing the sheet from the mould, while oil under pressure or air pressure directly, is introduced into the bottoms of the cylinders, 30, through the conduits 35. This serves to continue the upward movement of the frame member 8 after the frame member 7 reaches the limit of its upward travel thus disengaging the edges of the sheet and enabling the removal of the finished sheet by a mere lifting of it off of the frame member 7. In the case of undercut moulds, air under sufficient pressure to expand the formed sheet is, of course, employed.

From the foregoing description of the method, it will be apparent that it is a substantially automatic one and that all the steps are taken at precisely the right time to achieve fully effective results. Prevention of too great retracting movement of the frame members is effected by such elements as the caps 20 on the rods 6 and the arrival of the piston rod 31 at the end of its travel. Reversely, the cushioned accurate seating of the clamped sheet in its final downward position is controlled by the maintenance of the desired oil level below the air in the cylinders 30. Thus the piston seats down against an oil cushion and does so accurately, even though the seating is repeated many times.

A slightly modified form of the invention is illustrated in FIGURE 9. Here the upper frame member 8 is provided with an additional transverse frame member 85, while the mould 86, which may be of one piece or of separate mould members brought together beneath the transverse member 85, is provided with different contoured portions 87 and 88. Otherwise the mould and the bore holes 89 are the same as the mould 9, with its bore holes 76. Likewise, also, the frame members 7 and 8 clamp the sheet 90 in the same manner as the clamping of the sheet 26 and secure it against leakage at the corner 91.

Though the method has been described and the apparatus for carrying it out has been shown for vacuum moulding employing male moulds, it is, of course, appreciated that the reverse is also true. In fact, the method and apparatus of the invention may be employed for any formation of a relief pattern in a sheet of thermoplastic material, though the best results are achieved when the moulding is of the male type.

As heretofore already indicated, certain changes in carrying out the method and in the construction set forth which embody the invention may be made without departing from its scope, it is intended that all matter contained in the above description, or shown in the accompanying drawing, shall be interpreted as illustrative and not in a limiting sense. The invention, accordingly, comprises features of construction, combinations of elements, and arrangements of parts, and the several steps and the relation of one or more of such steps with respect to each of the others thereof, all of which will be exemplified hereinafter and the scope of the application of which will be indicated in the claims.

Having described my invention, what I claim as new and desire to secure by Letters Patent is:

1. The method of embossing sheets of thermoplastic material which comprises, clamping a sheet of such material around the edges thereof and moving the clamped sheet in a direction perpendicular to the plane of said sheet from a position above and spaced from a generally parallel facing mould to a position above and closely adjacent the generally parallel facing mould whose configuration is to be imparted to the sheet, effecting transverse reciprocal movement of a heating element in a plane spaced generally parallel to said clamped sheet from a position entirely removed from overlying facing relation to a position overlying the clamped sheet in heating relation thereto to locate the heating element on the reverse side of the sheet from the mould, heating the sheet while maintained in said position, effecting retrograde transverse reciprocal movement of the heating element in the plane thereof to terminate the heating effect of the heating element with respect to the sheet and while that retrograde transverse movement is being effected, moving the sheet so heated against the mould to drape the same over the mould solely by mechanical action under atmospheric pressure and, thereafter reducing the air pressure between the sheet and the mould to cause the sheet to take the exact configuration of the mould.

2. In apparatus for the moulding of thermoplastic sheets, a suction box formed with an open end to receive a mould, aligned frame members having interior peripheries slightly greater than the exterior periphery of said suction box, means for mounting said frame members in parallel spaced relation with respect to said open end of said suction box in alignment therewith and in parallel spaced relation with respect to each other, means to draw said parallel frame members together in a direction at right angles thereto to clamp a sheet therebetween and to move said clamped sheet in the same direction normal to said sheet into engagement with the mold, heating means for heating a sheet carried by said frame members, mounting means for mounting said heating means for reciprocal movement in a plane spaced generally parallel to said clamped sheet into a position overlying said frame members on the side thereof opposite said suction box and means for reciprocally moving said heating means into and out of said overlying position.

3. In a vacuum molding machine, a main frame including a molding area, a surface heater unit having an area substantially equal to said molding area, reciprocable mounting means for said heater unit whereby said heater unit is movable between a retracted position and a position overlying said molding area, a horizontal vacuum plate within the molding area of said main frame in substantially downwardly spaced relation from said heater unit mounting means, a clamping frame within the molding area of said main frame above said vacuum plate and comprising a lower frame part and an upper frame part with said frame parts being relatively movable between open and clamping positions, connecting means between said clamping frame and the main frame providing for raising and lowering the clamping frame relative to the horizontal vacuum plate while said clamping frame remains in a horizontal position as it is raised and lowered.

References Cited in the file of this patent

UNITED STATES PATENTS

| | | |
|---|---|---|
| Re. 23,171 | Borkland | Nov. 29, 1949 |
| 2,493,439 | Braund | Jan. 3, 1950 |
| 2,513,785 | Browne | July 4, 1950 |
| 2,559,705 | Borkland | July 10, 1951 |
| 2,568,129 | Morris | Sept. 18, 1951 |
| 2,690,593 | Abercrombie | Oct. 5, 1951 |